US010587645B2

(12) United States Patent
Gonen et al.

(10) Patent No.: US 10,587,645 B2
(45) Date of Patent: Mar. 10, 2020

(54) SYSTEMS AND METHODS TO BLOCK ACCOUNT CREATION FROM COMPUTING DEVICES

(71) Applicant: Facebook, Inc., Menlo Park, CA (US)

(72) Inventors: Aykud Gonen, Mountain View, CA (US); Chih Shao Lee, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 184 days.

(21) Appl. No.: 15/178,925

(22) Filed: Jun. 10, 2016

(65) Prior Publication Data

US 2017/0359369 A1    Dec. 14, 2017

(51) Int. Cl.
*H04L 29/08* (2006.01)
*H04L 29/06* (2006.01)

(52) U.S. Cl.
CPC ...... *H04L 63/1441* (2013.01); *H04L 63/0236* (2013.01); *H04L 63/10* (2013.01)

(58) Field of Classification Search
CPC .................. H04L 63/1441; H04L 63/0236
USPC .......................................................... 726/4
See application file for complete search history.

(56) References Cited

U.S. PATENT DOCUMENTS

| 8,538,379 | B1* | 9/2013 | Stachiw ......... H04M 15/43 379/114.01 |
| 9,100,430 | B1* | 8/2015 | Seiver .............. H04L 63/1433 |
| 9,363,283 | B1* | 6/2016 | Herrera-Yague ........... H04L 63/1425 |
| 2013/0139224 | A1* | 5/2013 | Wehmeier ......... G06F 21/552 726/4 |
| 2017/0103203 | A1* | 4/2017 | Sharma ............ G06F 21/552 |

* cited by examiner

*Primary Examiner* — Anthony D Brown
(74) *Attorney, Agent, or Firm* — Sheppard Mullin Richter & Hampton LLP

(57) ABSTRACT

Systems, methods, and non-transitory computer readable media are configured to determine an account through which illegitimate activity has been conducted on an online service. A plurality of computing devices from which the account was accessed are determined. At least a first computing device of the plurality of computing devices is blocked from creating a new account with the online service.

20 Claims, 8 Drawing Sheets

```
┌─────────────────────────────────────────────────────────────────┐
│  Determine neighboring accounts of an account an account through which │
│     illegitimate activity has been conducted on an online service      │
│                              552                                       │
└─────────────────────────────────────────────────────────────────┘
                                  │
                                  ▼
┌─────────────────────────────────────────────────────────────────┐
│   Determine computing devices used to access the neighboring accounts  │
│                              554                                       │
└─────────────────────────────────────────────────────────────────┘
                                  │
                                  ▼
┌─────────────────────────────────────────────────────────────────┐
│    Block the computing devices used to access the neighboring accounts │
│                              556                                       │
└─────────────────────────────────────────────────────────────────┘
```

SYSTEMS AND METHODS TO BLOCK ACCOUNT CREATION FROM COMPUTING DEVICES

FIELD OF THE INVENTION

The present technology relates to the field of online account management. More particularly, the present technology relates to techniques for redressing illegitimate activities related to accounts accessed on multiple computing devices.

BACKGROUND

An account with an online service or platform, such as a social networking system, can be created by a user to enjoy content and offerings provided by the online service or platform. The account can be first created or registered by the user on a particular computing device. The account can be later accessed by the user using that computing device or any variety of other computing devices. The computing devices can include a desktop computer, a laptop computer, a tablet, a mobile phone, or the like. In some instances, each computing device can be used by a variety of users to create or access their respective accounts.

SUMMARY

Various embodiments of the present technology can include systems, methods, and non-transitory computer readable media configured to determine an account through which illegitimate activity has been conducted on an online service. A plurality of computing devices from which the account was accessed are determined. At least a first computing device of the plurality of computing devices is blocked from creating a new account with the online service.

In an embodiment, the first computing device in comparison to other computing devices of the plurality of computing devices was most recently used to log into the account.

In an embodiment the first computing device is permanently blocked.

In an embodiment, the systems, methods, and non-transitory computer readable media are further configured to block the other computing devices of the plurality of computing devices from creating a new account with the online service.

In an embodiment, the other computing devices of the plurality of computing devices are temporarily blocked.

In an embodiment, the systems, methods, and non-transitory computer readable media are further configured to allow users to login into preexisting accounts with the online service from the plurality of computing devices.

In an embodiment, the systems, methods, and non-transitory computer readable media are further configured to determine neighboring accounts of the account. Computing devices used to access the neighboring accounts are determined. The computing devices used to access the neighboring accounts are blocked.

In an embodiment, the neighboring accounts are accounts with the online service that have been accessed from computing devices used to access the account.

In an embodiment, the computing devices used to access the neighboring accounts are temporarily blocked.

In an embodiment, the systems, methods, and non-transitory computer readable media are further configured to moderate the blocking at least a first computing device when accounts accessed from the first computing device satisfy a reputation score threshold.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Blocking Devices from New Account Creation

As mentioned, an account with an online service (or platform), such as a social networking system, can be created by a user to enjoy content and offerings provided by the online service or platform. The account can be first created or registered by the user on a particular computing device. The account can be later accessed by the user using that computing device or any variety of other computing devices. The computing devices can include a desktop computer, a laptop computer, a tablet, a mobile phone, or the like. In some instances, each computing device can be used by a variety of users to create or access their respective accounts.

One common challenge confronted by a social networking system is posting of inappropriate material or conduct of other illegitimate activity on the social networking system by a user of the social networking system. The illegitimate activity can include actions that are in violation of standards of the social networking system. To conduct an illegitimate activity on the social networking system, a user can first create (or register) an account on the social networking system from a computing device. After creation of the account, the user can login to the account from the computing device and conduct an illegitimate activity using the account. When the social networking system detects the occurrence of the illegitimate activity, the social networking system can deactivate the account of the user when the illegitimate activity warrants such remedial action. If the user wishes to engage in further illegitimate activity on the social networking system, the user can create a new account with the social networking system from the computing device to conduct the illegitimate activity. Once again, the social networking system can deactivate the newly created account as warranted. This repeated creation of new accounts from the computing device by the user to conduct illegitimate activities and the resulting deactivation of the accounts by the social networking system can be a long or endless cycle in which the user engaged in illegitimate activity remains a step ahead of the social networking system.

An improved approach rooted in computer technology overcomes the foregoing and other disadvantages associated with conventional approaches specifically arising in the realm of computer technology. Systems, methods, and computer readable media of the present technology can determine the occurrence of illegitimate activity conducted by a user on an online service (or platform), such as a social networking system. The illegitimate activity can be determined to have been conducted by the user with an account on the social networking system. The account can be deactivated when the illegitimate activity so warrants. The computing devices used by the user to access the account are determined. The computing devices may be used by others in addition to the user. A computing device that the user most recently logged into can constitute a primary computing device. The primary computing device can be permanently blocked from creation of new accounts with the social networking system. Remaining computing devices, apart from the primary computing device, can constitute secondary computing devices. The secondary computing devices can be temporarily blocked from creation of new accounts with the social networking system. Access to preexisting accounts on the primary computing device and the secondary computing devices can remain unaffected. In some instances, other accounts that were accessed on computing devices from which the deactivated account was accessed can be determined. Computing devices employed to access the other accounts can be temporarily blocked. In some cases, permanent blocking or temporary blocking of a computing device can be moderated based on reputation scores associated with accounts accessed from the computing device. For example, if the accounts accessed from the computing device reflect high reputation scores, blocking of the computing device can be reduced or eliminated. More details regarding the present technology are described herein.

Figure 1:
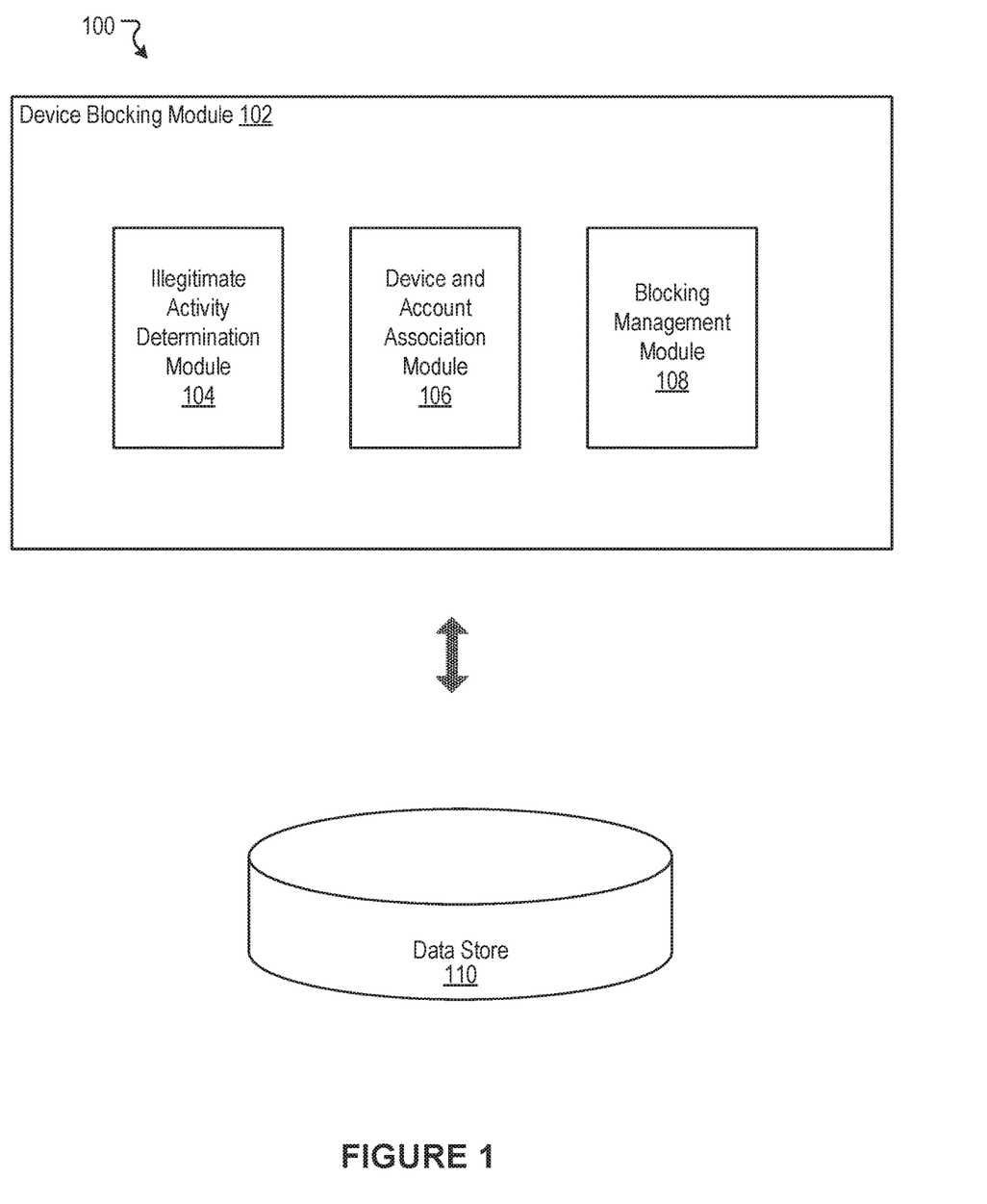
FIG. 1 illustrates a system including an example device blocking module, according to an embodiment of the present technology.

FIG. 1 illustrates an example system 100 including an example device blocking module 102 configured to selectively block computing devices from creation (or registration) of new accounts with an online service (or platform), according to an embodiment of the present technology. In some embodiments, the online service can include a social networking system. The computing devices can include, for example, any combination of desktop computers, laptop computers, tablets, mobile phones, and the like. The blocking of computing devices can be in response to posting of inappropriate content (e.g., pornography, terrorism, etc.) or conduct of other illegitimate activity in violation of user terms, terms of service, a publication policy, or community standards of the online service. The blocking of computing devices in accordance with the present technology can help to redress problems associated with repeated creation of new accounts by a user engaged in illegitimate activities.

The device blocking module 102 can include an illegitimate activity determination module 104, a device and account association module 106, and a blocking management module 108. The example system 100 can include a data store 110 in communication with the device blocking module 102. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the device blocking module 102 can be implemented in any suitable combinations.

The illegitimate activity determination module 104 can determine the occurrence of illegitimate activity in connection with the online service. The illegitimate activity can be conducted through an account of a user of the online service. The account can be accessed from one or more computing devices associated with the user. In some embodiments, the illegitimate activity can be detected automatically. For example, machine learning models trained to recognize inappropriate content can be employed to identify inappropriate content posted on a social networking system. In some instances, illegitimate activity also can be determined through manual review. For example, manual review of postings to the online service can result in labeling of certain postings as illegitimate activity. The determination of illegitimate activity can cause selective blocking of one or more computing devices associated with the user and potentially other computing devices as well, as described in more detail herein.

The device and account association module 106 can associate each account of an online service with one or more computing devices used to access the account. In particular, the device and account association module 106 can monitor an account of a user and computing devices from which user accesses the account. For example, the account can be an account through which illegitimate activity has been conducted on the online service. Access to the account can include visits to or interactions with the online service. Based on the monitoring, the device and account association module 106 can determine, for each account, the computing devices that have been used to access the account. Further, based on the monitoring, the device and account association module 106 can determine, for each computing device used to access the account, other accounts that have been accessed from the computing device.

The blocking management module 108 can selectively block computing devices from creation of new accounts based at least in part on an account through which a user has conducted illegitimate activity. In some cases, the blocking management module 108 can selectively apply permanent blocking to some computing devices and temporary blocking to other computing devices. In some instances, the blocking management module 108 can modify blocking determined for computing devices based on reputation scores associated with accounts. The blocking management module 108 is discussed in more detail herein.

In some embodiments, the device blocking module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the device blocking module 102 can be, in part or in whole, implemented as software running on one or more computing devices or systems, such as on a server or a client computing device. For example, the device blocking module 102 can be, in part or in whole, implemented within or configured to operate in conjunction or be integrated with a social networking system (or service), such as a social networking system 630 of FIG. 6. As another example, the device blocking module 102 can be implemented as or within a dedicated application (e.g., app), a program, or an applet running on a user computing device or client computing system. In some instances, the device blocking module 102 can be, in part or in whole, implemented within or configured to operate in conjunction or be integrated with client computing device, such as a user device 610 of FIG. 6. It should be understood that many variations are possible.

The data store 110 can be configured to store and maintain various types of data, such as the data relating to support of and operation of the device blocking module 102, such as associations between computing devices and accounts accessed from the computing devices, designations of primary computing devices and secondary computing devices, types of blocking (e.g., permanent blocking, temporary blocking) applied to computing devices, number of blocks applied to a computing device, etc. The data store 110 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the device blocking module 102 can be configured to communicate and/or operate with the data store 110.

Figure 2:
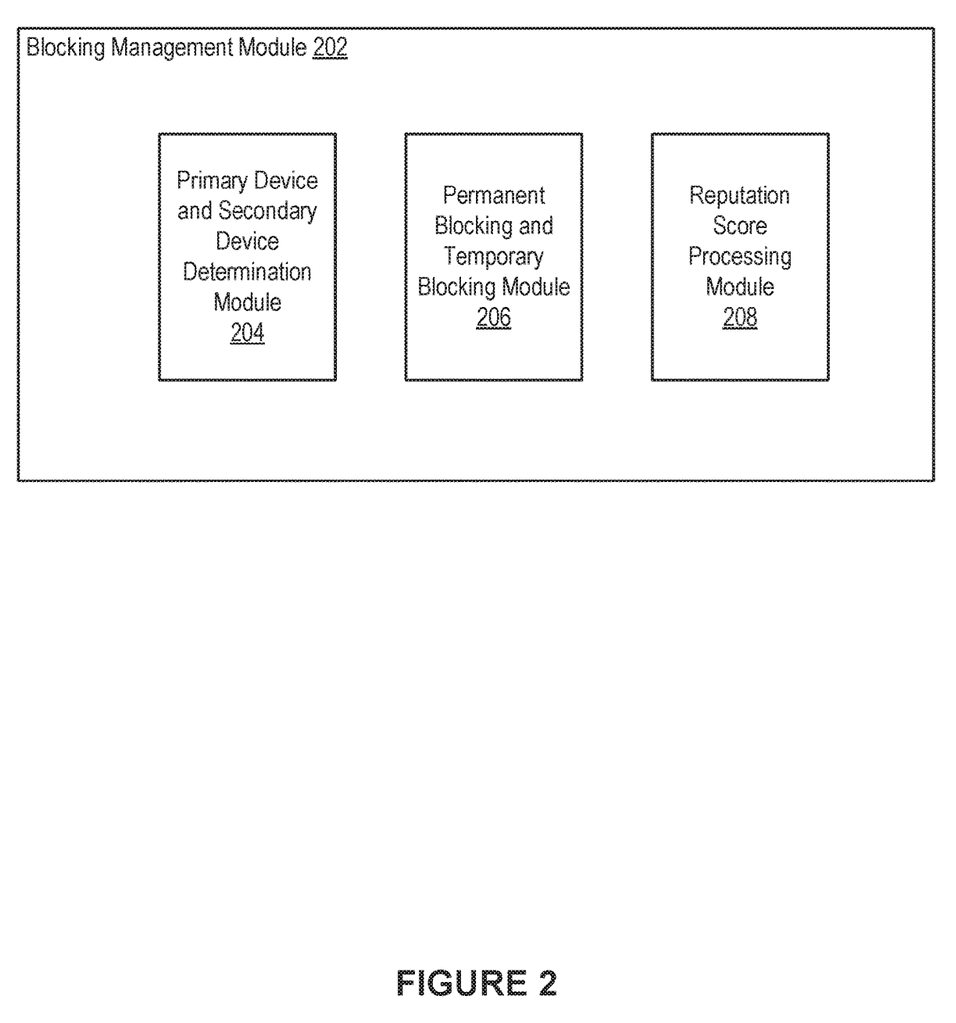
FIG. 2 illustrates an example blocking management module, according to an embodiment of the present technology.

FIG. 2 illustrates an example blocking management module 202, according to an embodiment of the present technology. In some embodiments, the blocking management module 108 of FIG. 1 can be implemented with the blocking management module 202. The blocking management module 202 can include a primary device and secondary device determination module 204, a permanent blocking and temporary blocking module 206, and a reputation score processing module 208.

The primary device and secondary device determination module 204 can assign designations to computing devices used to access an account through which illegitimate activity has been conducted and related computing devices. When an illegitimate activity conducted by a user is determined, an account through which the illegitimate activity was conducted can be identified. The computing devices used to access the account can be determined. Of these computing devices, the primary device and secondary device determination module 204 can designate as a primary computing device a computing device that was most recently used by the user to log into the account. In some cases, the primary computing device can be the computing device that was most recently used by the user to log into the account before detection of illegitimate activity by the device blocking module 102. In some instances, the primary computing device can be another computing device that satisfies other criteria. The primary device and secondary device determination module 204 can designate as secondary (or neighboring) computing devices the remainder of these computing devices used to access the account through which the illegitimate activity has been conducted.

The permanent blocking and temporary blocking module 206 can deactivate accounts and selectively block associated computing devices based at least in part on their designation. The permanent blocking and temporary blocking module 206 can deactivate an account through which illegitimate activity has been conducted. The permanent blocking and temporary blocking module 206 can permanently block a primary computing device associated with the account. In some embodiments, permanent blocking of a computing device can preclude creation of new accounts with the online service using the primary computing device on a permanent or indefinite basis. The permanent blocking and temporary blocking module 206 can temporarily block one or more secondary computing devices associated with the account. In some embodiments, temporary blocking of a computing device can preclude creation of new accounts with the online service using a secondary device on a temporary basis or for a selected amount of time. For example, the selected amount of time associated with temporary blocking can be 14 days or any other suitable duration. In some embodiments, after a computing device has been temporarily blocked for a selected number of times (e.g., three times), the computing device can be permanently blocked. In some cases, when a computing device is permanently blocked or temporarily blocked, an attempt by a user to create a new account from the computing device with the online service can trigger a notice or message to be presented to the user, informing the user that the computing device has been blocked, permanently blocked, or temporarily blocked from account creation, as appropriate. In various embodiments, permanent blocking or temporary blocking of a computing device does not preclude access to an already activated or preexisting account from the computing device.

In some embodiments, the permanent blocking and temporary blocking module 206 can block additional computing devices. For example, an account through which illegitimate activity has been conducted can be accessed through a primary computing device and secondary computing devices. The device and account association module 106 can determine other accounts with the online service that have been accessed from the primary computing device and the secondary computing devices. The other accounts can constitute neighboring accounts of the account. Based on the device and account association module 106, computing devices used to access the neighboring accounts can be determined. The permanent blocking and temporary blocking module 206 can additionally block some or all of the computing devices used to access these neighboring accounts. In some embodiments, the additional blocking can be temporary blocking of the computing devices for any selected amount of time. In some instances, additional blocking is not applied to a computing device if the computing device is already subject to blocking as a primary computing device or a secondary computing device.

The reputation score processing module 208 can selectively apply blocking, alter blocking, or remove blocking of a computing device based on one or more reputation scores. In some embodiments, a reputation score can be associated with each account. For example, a relatively higher reputation score for an account can indicate that the account has a relatively good reputation in connection with illegitimate activities and a relatively lower reputation score for an account can indicate that the account has a relatively bad reputation in connection with illegitimate activities. In some cases, the reputation score for an account of a user can be based on interactions by the user with an online service and, for example, feedback of other users with the online service. In some embodiments, the reputation score processing module 208 can moderate blocking of a computing device when accounts accessed from the computing device satisfy a reputation score threshold. Moderating blocking of a computing device can include, for example, blocking the computing device for a lesser amount of time, ceasing blocking of the computing device, or not blocking the computing device in the first place. For example, if a primary computing device is or is to be permanently blocked, the reputation score processing module 208 can cause the primary computing device to be temporarily blocked or not to be blocked at all. In some instances, the reputation score threshold can be a minimum reputation score that must be achieved for one or more accounts associated with a computing device. In various embodiments, the reputation score processing module 208 also can modify a reputation score associated with an account based on action taken by the account. For example, if an account has a relatively higher reputation score, the reputation score processing module 208 can lower the reputation score for the account if the account was accessed on a computing device that has been permanently or temporarily blocked. Many variations are possible.

Figure 3:
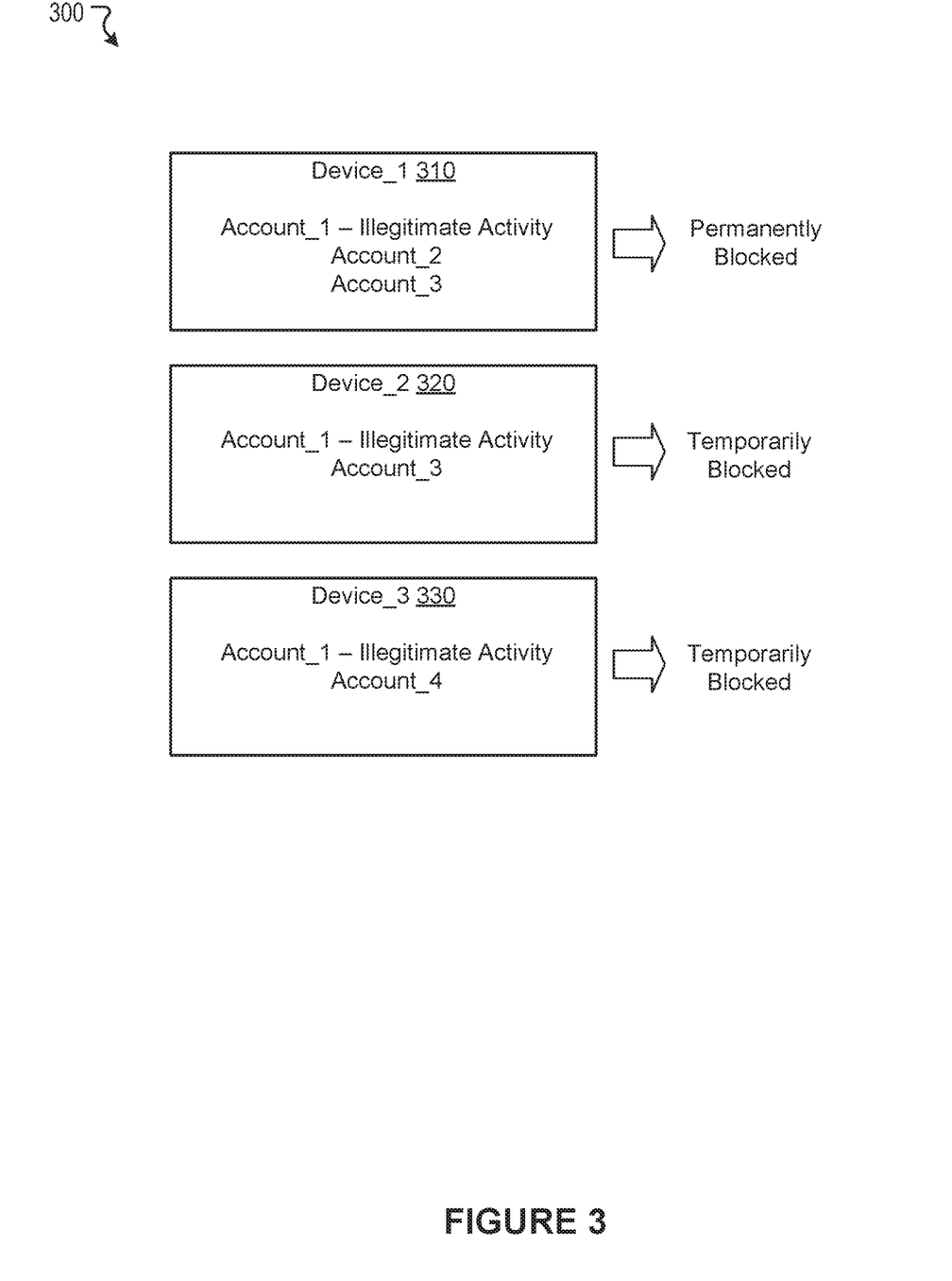
FIG. 3 illustrates a first example scenario relating to blocking of computing devices, according to an embodiment of the present technology.

FIG. 3 illustrates a first example scenario 300 relating to blocking of computing devices, according to an embodiment of the present technology. The device blocking module 102 can identify accounts with an online service and computing devices used to access the accounts. As shown, device_1 310, device_2 320, and device_3 330 are computing devices used to access one or more accounts with an online service, such as a social networking system. Device_1 310, device_2 320, and device_3 330 can be any combination of desktop computers, laptop computers, tablets, mobile phones, and the like. One or more of device_1 310, device_2 320, and device_3 330 can be shared by a plurality of users of the online service. Account_1, account_2, account_3, and account_4 are accounts with the online service that have been accessed by the computing devices. Account_1, account_2, account_3, and account_4 can be accounts associated with different users of the online service. Other scenarios can involve any other number of accounts or computing devices used to access the accounts.

The device blocking module 102 has determined associations between each computing device and associated accounts that have been accessed from the computing device. In the example scenario 300, device_1 310 has been used to access account_1, account_2, and account_3; device_2 320 has been used to access account_1 and account_3; and device_3 330 has been used to access account_1 and account_4.

In the example scenario 300, the device blocking module 102 has determined that a user associated with account_1 has engaged in illegitimate activity on the online service. In some instances, account_1 can be deactivated in response to the illegitimate activity, as warranted. Account_1 has been accessed from device_1 310, device_2 320, and device_3 330. The device blocking module 102 also has determined that device_1 310 is the computing device that the user most recently logged into. Accordingly, device_1 310 is designated as a primary computing device. Device_2 320 and device_3 330, which are the remaining computing devices associated with account_1, can be designated as secondary (or neighboring) computing devices. As the primary computing device, device_1 310 can be permanently blocked so that new accounts with the online service cannot be created from device_1 310. As secondary computing devices, device_2 320 and device_3 330 can be temporarily blocked so that new accounts with the online service cannot be created from device_2 320 or device_3 330 for a selected amount of time. The selected amount of time can be any suitable amount of time (e.g., 14 days, one month, etc.). Despite blocking applied to device_1 310, device_2 320, and device_3 330 with respect to the creation of new accounts, preexisting accounts can continue to be accessed from the computing devices. Many variations are possible in accordance with the present technology.

Figure 4:
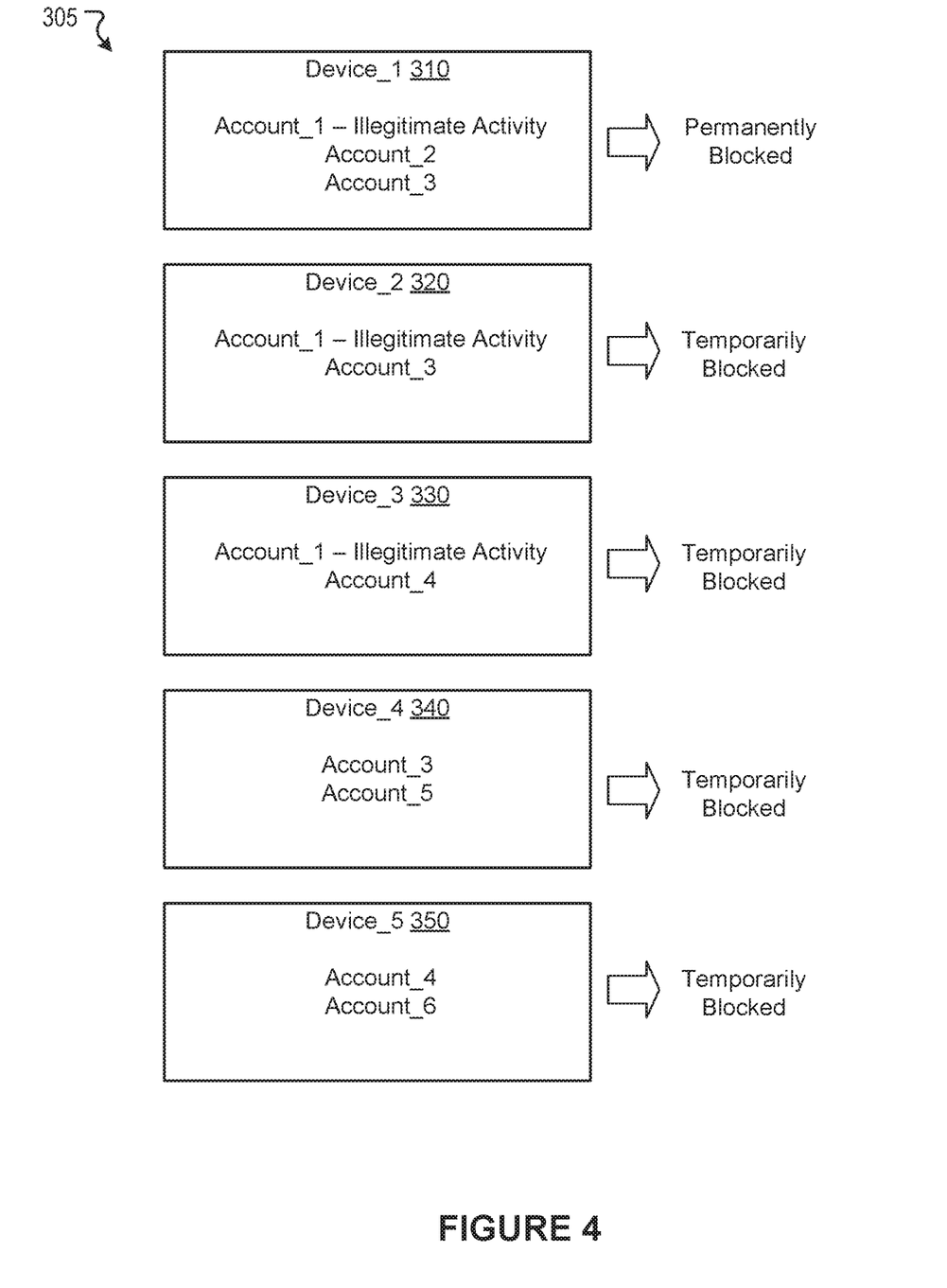
FIG. 4 illustrates a second example scenario relating to blocking of computing devices, according to an embodiment of the present technology.

FIG. 4 illustrates a second example scenario 305 relating to blocking of computing devices, according to an embodiment of the present technology. Like the example scenario 300, the example scenario 305 involves device_1 310, device_2 320, and device_3 330, which are computing devices used to access one or more accounts with an online service, such as a social networking system. Device_1 310, device_2 320, and device_3 330 can be any combination of desktop computers, laptop computers, tablets, mobile phones, and the like. Account_1, account_2, account_3, and account_4 are accounts with the online service that have been accessed by the computing devices. In the example scenario 305, device_4 340 and device_5 350 are additional computing devices used to access one or more accounts with the online service. Account_5 and account_6 are additional accounts with the online service that have been accessed by the computing devices. Other scenarios can involve any other number of accounts or computing devices used to access the accounts.

The device blocking module 102 has determined associations between each computing device and associated accounts that have been accessed from the computing device. In the example scenario 305, device_1 310 has been used to access account_1, account_2, and account_3; device_2 320 has been used to access account_1 and account_3; device_3 330 has been used to access account_1 and account_4; device_4 340 has been used to access account_3 and account_5; and device_5 350 has been used to access account_4 and account_6.

Like the example scenario 300, the device blocking module 102 has determined that a user associated with account_1 has engaged in illegitimate activity on the online service in the example scenario 305. In some instances, account_1 can be deactivated in response to the illegitimate activity, as warranted. As the primary computing device, device_1 310 can be permanently blocked so that new accounts with the online service cannot be created on device_1 310. As secondary computing devices, device_2 320 and device_3 330 can be temporarily blocked so that new accounts with the online service cannot be created on device_2 320 or device_3 330 for a selected amount of time.

Further, the device blocking module 102 can block additional computing devices based on neighboring accounts of an account through which illegitimate activity has been conducted. In the example scenario 305, account_1 is the account through which illegitimate activity has been conducted. On device_1 310, account_1 has neighboring accounts account_2 and account_3. On device_2 320, account_1 has neighboring account account_3. On device_3 330, account_1 has neighboring account account_4. Accordingly, the neighboring accounts of account_1 are account_2, account_3, and account_4. The device blocking module 102 can block computing devices that are used to access these neighboring accounts. In particular, device_4 340 can be blocked because device_4 340 was used to access neighboring account account_3. Further, device_5 350 can be blocked because device_5 350 was used to access neighboring account account_4. In the example scenario 305, device_4 340 and device_5 350 can be temporarily blocked. In other cases, other types of blocking (e.g., permanent blocking) can be used. Many variations are possible in accordance with the present technology.

Figure 5A:
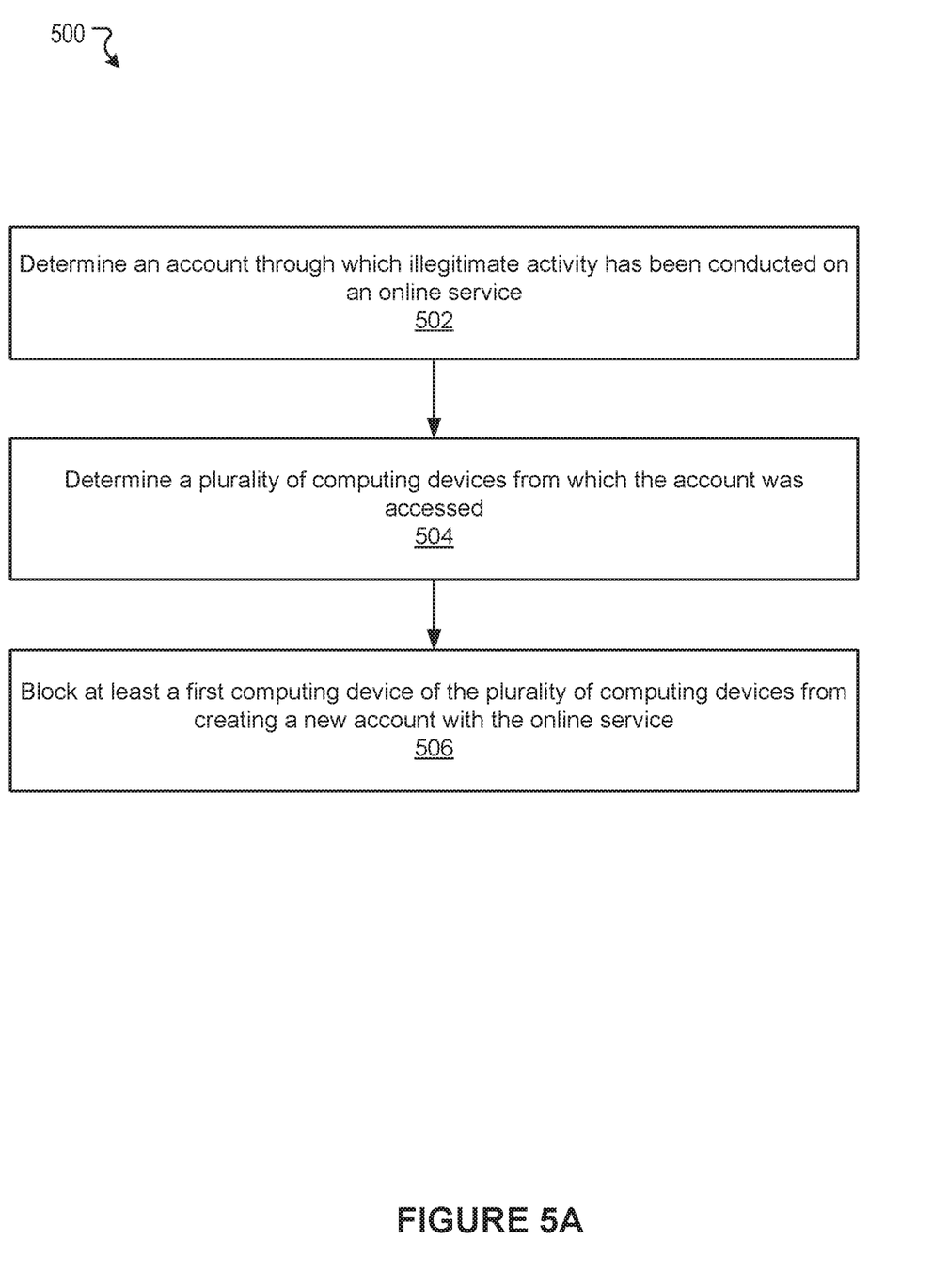
FIG. 5A illustrates a first example method to block a computing device, according to an embodiment of the present technology.

FIG. 5A illustrates a first example method 500 to block a computing device, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can determine an account through which illegitimate activity has been conducted on an online service. At block 504, the method 500 can determine a plurality of computing devices from which the account was accessed. At block 506, the method 500 can block at least a first computing device of the plurality of computing devices from creating a new account with the online service. Other suitable techniques that incorporate various features and embodiments of the present technology are possible.

Figure 5B:
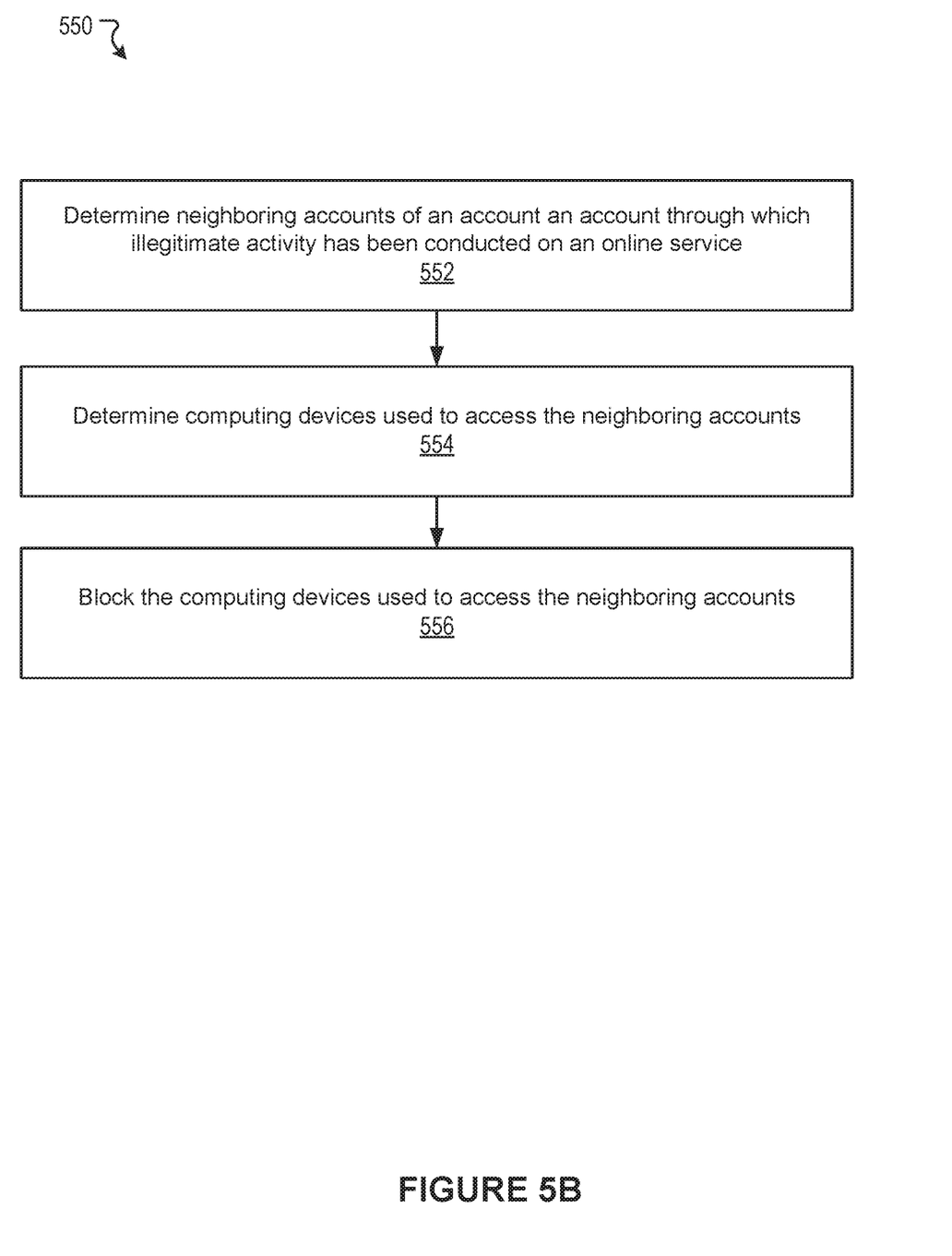
FIG. 5B illustrates a second example method to block a computing device, according to an embodiment of the present technology.

FIG. 5B illustrates a second example method 550 to block a computing device, according to an embodiment of the present technology. It should be appreciated that there can be additional, fewer, or alternative steps performed in similar or alternative orders, or in parallel, in accordance with the various embodiments and features discussed herein unless otherwise stated.

At block 552, the method 550 can determine neighboring accounts of an account an account through which illegitimate activity has been conducted on an online service. At block 554, the method 550 can determine computing devices used to access the neighboring accounts. At block 556, the method 550 can block the computing devices used to access the neighboring accounts. Other suitable techniques that incorporate various features and embodiments of the present technology are possible.

It is contemplated that there can be many other uses, applications, features, possibilities, and variations associated with various embodiments of the present technology. For example, users can choose whether or not to opt-in to utilize the present technology. The present technology also can ensure that various privacy settings, preferences, and configurations are maintained and can prevent private information from being divulged. In another example, various embodiments of the present technology can learn, improve, and be refined over time.

Social Networking System—Example Implementation

Figure 6:
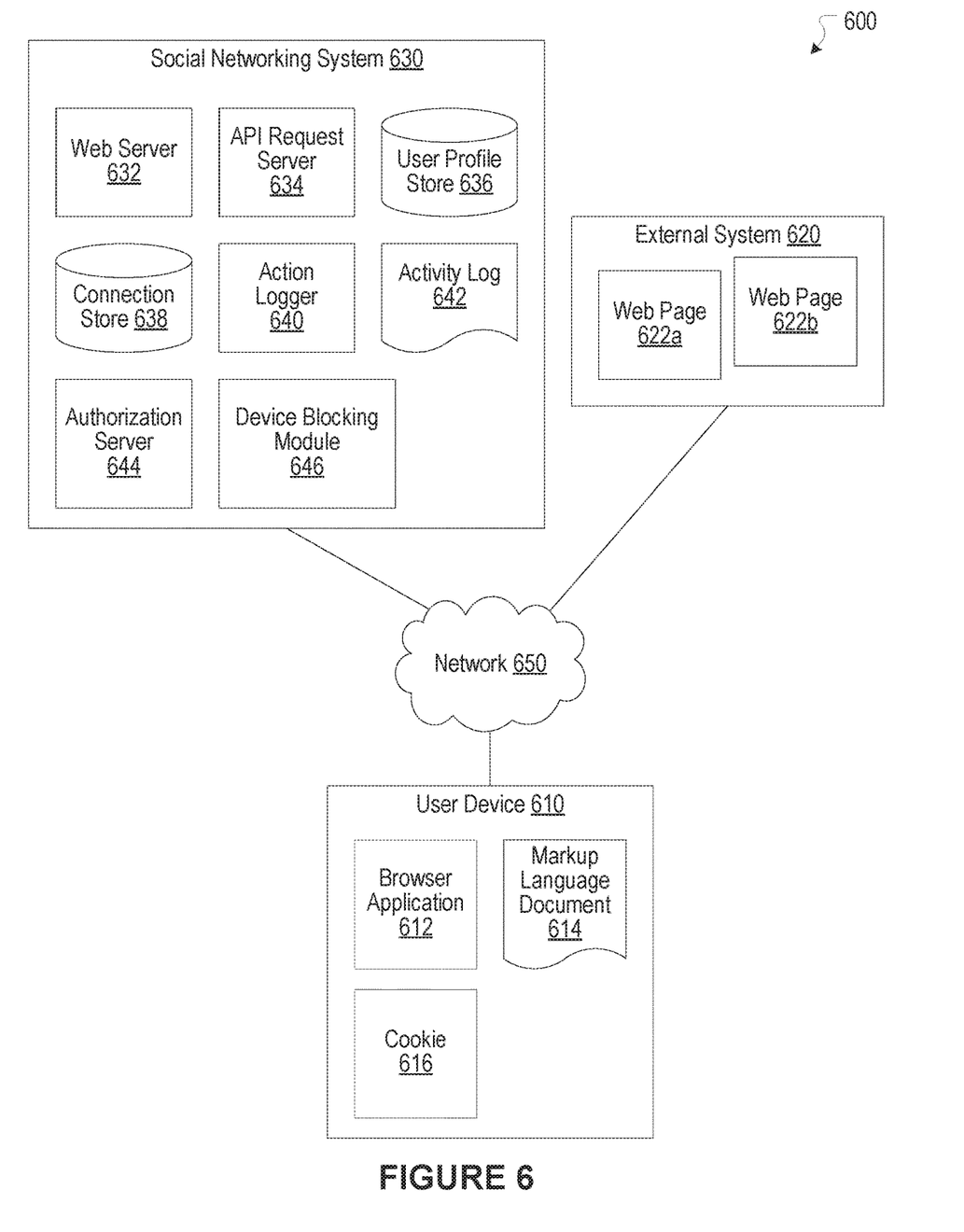
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a device blocking module 646. The device blocking module 646 can be implemented with the device blocking module 102, as discussed in more detail herein. In some embodiments, one or more functionalities of the device blocking module 646 can be implemented in the user device 610.

Hardware Implementation

Figure 7:
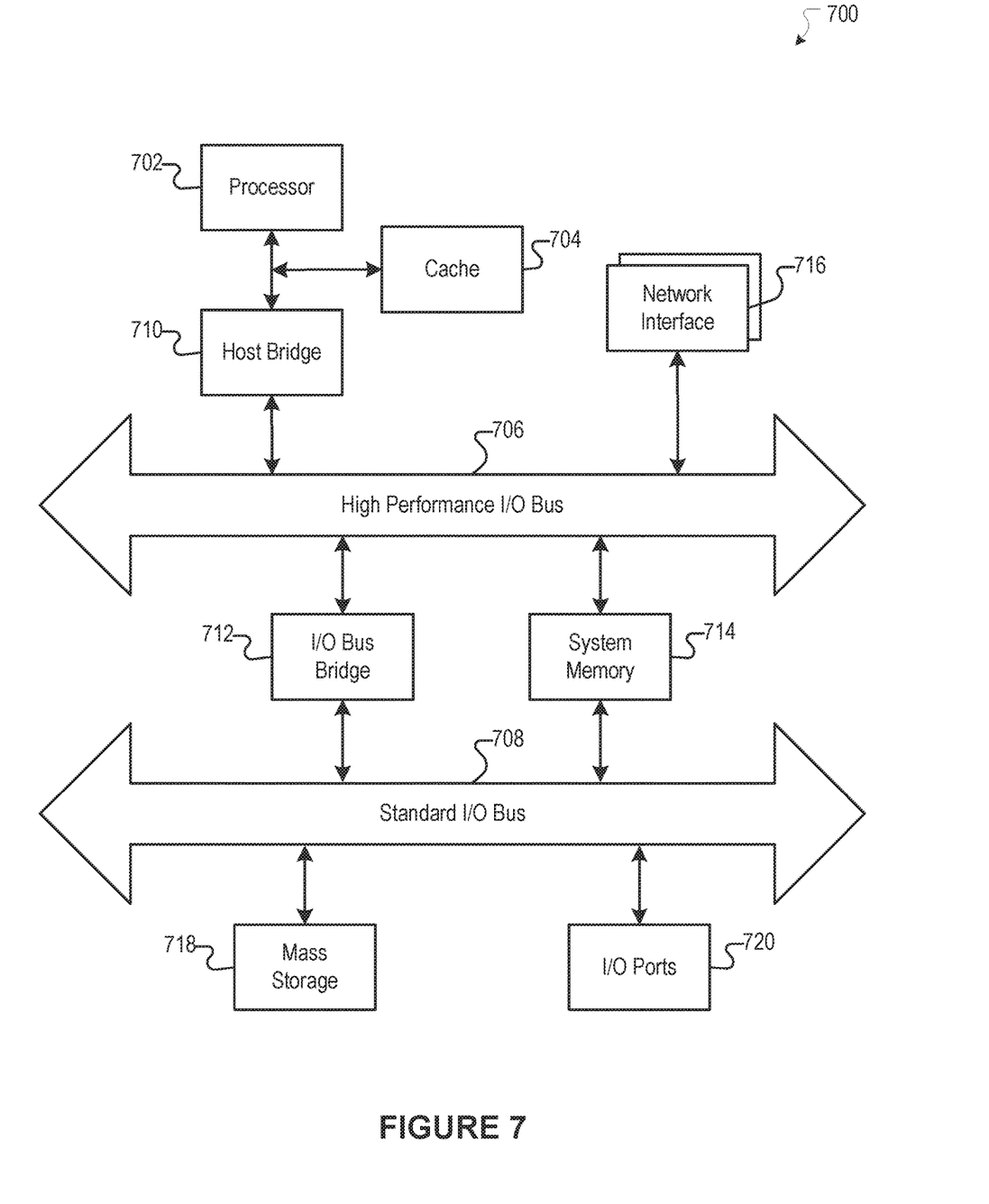
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs));

other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, an account associated with illegitimate activity on an online service;
   determining, by the computing system, a plurality of computing devices from which the account was accessed;
   blocking, by the computing system, new account creation with the online service on a first computing device of the plurality of computing devices, wherein the blocking the new account creation does not preclude access from the first computing device to one or more preexisting accounts; and
   moderating, by the computing system, the blocking of the first computing device based at least in part on a reputation score determined from the one or more preexisting accounts, wherein the moderating the blocking includes at least one of: blocking for a lesser amount of time based at least in part on the reputation score satisfying a reputation score threshold or blocking for a greater amount of time based at least in part on the reputation score failing to satisfy the reputation score threshold.

2. The computer-implemented method of claim 1, wherein the first computing device, in comparison to other computing devices of the plurality of computing devices, was most recently used to log into the account.

3. The computer-implemented method of claim 2, wherein the first computing device is permanently blocked.

4. The computer-implemented method of claim 2, further comprising:
   blocking, by the computing system, new account creation with the online service on the other computing devices of the plurality of computing devices.

5. The computer-implemented method of claim 4, wherein the other computing devices of the plurality of computing devices are temporarily blocked.

6. The computer-implemented method of claim 1, further comprising:
   allowing, by the computing system, users to login into the one or more preexisting accounts with the online service from the plurality of computing devices.

7. The computer-implemented method of claim 1, further comprising:
   determining, by the computing system, neighboring accounts of the account;
   determining, by the computing system, computing devices used to access the neighboring accounts; and
   blocking, by the computing system, new account creation with the online service on the computing devices used to access the neighboring accounts.

8. The computer-implemented method of claim 7, wherein the neighboring accounts are accounts with the online service that have been accessed from the plurality of computing devices from which the account was accessed.

9. The computer-implemented method of claim 7, wherein the computing devices used to access the neighboring accounts are temporarily blocked.

10. The computer-implemented method of claim 1, wherein the reputation score is based on feedback of users associated with the online service.

11. A system comprising:
    at least one processor; and
    a memory storing instructions that, when executed by the at least one processor, cause the system to perform:
    determining an account associated with illegitimate activity on an online service;
    determining a plurality of computing devices from which the account was accessed;
    blocking new account creation with the online service on a first computing device of the plurality of computing devices, wherein the blocking the new account creation does not preclude access from the first computing device to one or more preexisting accounts; and
    moderating the blocking of the first computing device based at least in part on a reputation score determined from the one or more preexisting accounts, wherein the moderating the blocking includes at least one of: blocking for a lesser amount of time based at least in part on the reputation score satisfying a reputation score threshold or blocking for a greater amount of time based at least in part on the reputation score failing to satisfy the reputation score threshold.

12. The system of claim 11, wherein the first computing device, in comparison to other computing devices of the plurality of computing devices, was most recently used to log into the account.

13. The system of claim 12, wherein the first computing device is permanently blocked.

14. The system of claim 12, further comprising:
blocking new account creation with the online service on the other computing devices of the plurality of computing devices.

15. The system of claim 14, wherein the other computing devices of the plurality of computing devices are temporarily blocked.

16. A non-transitory computer-readable storage medium including instructions that, when executed by at least one processor of a computing system, cause the computing system to perform a method comprising:
determining an account associated with illegitimate activity on an online service;
determining a plurality of computing devices from which the account was accessed;
blocking new account creation with the online service on a first computing device of the plurality of computing devices, wherein the blocking the new account creation does not preclude access from the first computing device to one or more preexisting accounts; and
moderating the blocking of the first computing device based at least in part on a reputation score determined from the one or more preexisting accounts, wherein the moderating the blocking includes at least one of: blocking for a lesser amount of time based at least in part on the reputation score satisfying a reputation score threshold or blocking for a greater amount of time based at least in part on the reputation score failing to satisfy the reputation score threshold.

17. The non-transitory computer-readable storage medium of claim 16, wherein the first computing device, in comparison to other computing devices of the plurality of computing devices, was most recently used to log into the account.

18. The non-transitory computer-readable storage medium of claim 17, wherein the first computing device is permanently blocked.

19. The non-transitory computer-readable storage medium of claim 17, further comprising:
blocking new account creation with the online service on the other computing devices of the plurality of computing devices.

20. The non-transitory computer-readable storage medium of claim 19, wherein the other computing devices of the plurality of computing devices are temporarily blocked.

* * * * *